(12) United States Patent
Hess et al.

(10) Patent No.: US 11,178,996 B2
(45) Date of Patent: Nov. 23, 2021

(54) REMOVAL OF A CAPSULE FROM A CAPSULE HOLDER

(71) Applicant: NESTEC S.A., Vevey (CH)

(72) Inventors: Michel Hess, Winterthur (CH); Stefan Schai, Wil (CH); Alain Teklits, Corsier (CH)

(73) Assignee: Societe des Produits Nestle S.A., Vevey (CH)

( * ) Notice: Subject to any disclaimer, the term of this patent is extended or adjusted under 35 U.S.C. 154(b) by 295 days.

(21) Appl. No.: 16/303,375

(22) PCT Filed: May 22, 2017

(86) PCT No.: PCT/EP2017/062217
§ 371 (c)(1),
(2) Date: Nov. 20, 2018

(87) PCT Pub. No.: WO2017/202746
PCT Pub. Date: Nov. 30, 2017

(65) Prior Publication Data
US 2020/0323385 A1    Oct. 15, 2020

(30) Foreign Application Priority Data

May 23, 2016 (EP) ..................................... 16170814

(51) Int. Cl.
*A47J 31/36*    (2006.01)

(52) U.S. Cl.
CPC ....... *A47J 31/3638* (2013.01); *A47J 31/3604* (2013.01); *A47J 31/3676* (2013.01)

(58) Field of Classification Search
CPC . A47J 31/3638; A47J 31/3223; A47J 31/3604
(Continued)

(56) References Cited

U.S. PATENT DOCUMENTS

| 7,320,274 B2 * | 1/2008 | Castellani ........... A47J 31/0673 99/289 R |
| 2002/0148356 A1 * | 10/2002 | Lazaris ............... A47J 31/0668 99/295 |

(Continued)

FOREIGN PATENT DOCUMENTS

| CH | 700288 | 7/2010 |
| EP | 1669011 | 6/2006 |

(Continued)

*Primary Examiner* — Reginald Alexander
(74) *Attorney, Agent, or Firm* — K&L Gates LLP

(57) ABSTRACT

A capsule processing machine (1) for preparing a beverage from a capsule (5) having a body (50) containing an ingredient. The machine (1) has a holder (10) with a cavity (11) having an upwardly oriented mouth (12) and a cover (20) cooperating with the holder (10). The cover (20) and the holder (10) are relatively movable along a movement path (14) from: an open position for inserting the capsule (5) inbetween the holder (10) and cover (20) into the cavity (11) and/or for removing the capsule (5) therefrom; to a closed position for extracting the capsule (5) in the cavity (11). The machine (1) includes a capsule transfer device (30) having a capsule guide (31) for guiding the capsule (5) from the holder (10) to a used-capsule evacuation area (40). The capsule guide (31) extends along an evacuation direction (31') and is configured to seize the capsule (5) and hold the capsule (5) above the holder (10) and to guide the capsule (5) towards the evacuation area (40) along the evacuation direction (31'). The movement path (14) and the evacuation direction (31') are at an angle ($\alpha 1, \alpha 2, \alpha 3, \alpha 4$) favouring a movement of the capsule (5) under the effect of gravity along the capsule guide (31) towards the evacuation area (40). The capsule guide (31) is tillable during the relative movement of the holder (10) and the cover (20) from the closed position to the open position to reduce the angle (Continued)

($\alpha 1, \alpha 2, \alpha 3, \alpha 4$) so as to increase the effect of gravity for moving the capsule (5).

18 Claims, 2 Drawing Sheets

(58) Field of Classification Search
USPC .................................................. 99/289 R, 295
See application file for complete search history.

(56) References Cited

U.S. PATENT DOCUMENTS

| | | | |
|---|---|---|---|
| 2003/0071056 A1 | 4/2003 | Hale | |
| 2007/0068394 A1* | 3/2007 | Jarisch | A47J 31/3638 99/279 |
| 2010/0011965 A1* | 1/2010 | Turi | A47J 31/3638 99/289 R |
| 2011/0017072 A1* | 1/2011 | Frigeri | A47J 31/3695 99/289 P |

FOREIGN PATENT DOCUMENTS

| | | |
|---|---|---|
| GB | 2449213 | 11/2008 |
| WO | 2012041605 | 4/2012 |

\* cited by examiner

REMOVAL OF A CAPSULE FROM A CAPSULE HOLDER

CROSS REFERENCE TO RELATED APPLICATIONS

The present application is a National Stage of International Application No. PCT/EP2017/062217, filed on May 22, 2017, which claims priority to European Patent Application No. 16170814.4, filed on May 23, 2016, the entire contents of which are being incorporated herein by reference.

FIELD OF THE INVENTION

The field of the invention pertains to beverage preparation machines using capsules, of an ingredient of the beverage to be prepared and to the removal of such capsules from the machines.

For the purpose of the present description, a "beverage" is meant to include any human-consumable liquid substance, such as tea, coffee, hot or cold chocolate, milk, soup, baby food, etc. . . . . A "capsule" is meant to include any container such as a packaging for containing a pre-portioned beverage ingredient, e.g. a flavouring ingredient, the packaging forming an enclosure of any material, in particular an airtight or pervious material, porous or non-porous material, e.g. plastic, aluminium, recyclable and/or biodegradable packagings, and of any shape and structure, including soft pods or rigid cartridges for containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use. Examples of such brewing devices are disclosed in EP 1 767 129, WO 2009/043630, WO 2005/004683 and WO 2007/135136. The preparation of a beverage by using centrifugation is also known. Examples of centrifugation processes and corresponding devices are disclosed in WO2008/148601, WO2008/148650, U.S. Pat. No. 5,566,605, WO 2013/007776, WO 2013/007779 and WO 2013/007780.

Irrespectively of the extraction process itself it has also been proposed to facilitate the handling of capsules by systems for extracting them, in particular by motorizing the opening and/or closure of the extraction system for inserting and/or removing a capsule. Examples of such systems are for example disclosed in EP 1 767 129, WO2009/113035, WO 2012/025258, WO 2012/025259, WO 2012/041605, WO 2013/127476, WO 2014/096122, WO 2014/096123 and EP2015185946.9.

The preparation of a beverage by using centrifugation is also known. Such beverage preparation includes: providing a beverage (flavoring) ingredient, e.g. as powder and/or leaves, in a capsule; circulating liquid into the capsule and rotating the capsule at sufficient speed to ensure interaction of the liquid with the ingredient while creating a gradient of pressure of liquid in the capsule. Such pressure increases gradually from the centre towards the periphery of the capsule. As liquid traverses the ingredient, e.g. coffee bed, extraction of the ingredient, e.g. coffee compounds, takes place and a liquid extract is obtained that flows out at the periphery of the capsule. Examples of such systems are disclosed in WO2008/148601, WO 2013/007776, WO 2013/007779 and WO 2013/007780.

SUMMARY OF THE INVENTION

The invention relates to a capsule processing machine for preparing a beverage from at least one ingredient. Normally such beverage is then dispensed to a user, e.g. to a user-cup or user-mug.

For instance, the machine is a coffee, tea, chocolate, cacao, milk or soup preparation machine. For example, the machine is arranged for preparing within a beverage processing module that includes the capsule holder, a beverage by passing hot or cold water or another liquid through a capsule held in the holder containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 250 ml, e.g. the volume for filling a cup or mug, depending on the type of beverage. Formed and dispensed beverages may be selected from ristrettos, espressos, lungos, cappuccinos, caf latte, americano coffees, teas, etc. . . . . For example, a coffee machine may be configured for dispensing espressos, e.g. an adjustable volume of 20 to 60 ml per serving, and/or for dispensing lungos, e.g. a volume in the range of 70 to 200 ml per serving.

An aspect of the invention relates to a capsule processing machine for preparing a beverage from a capsule having a body containing an ingredient. For instance, the beverage is prepared by circulating a liquid into such capsule and centrifugally driving such capsule.

Typically, the capsule has a body containing an ingredient and a peripherally projecting flange, e.g. a body in the shape of a cup and a lid covering the mouth of the cup and extending beyond the mouth to form the peripherally projecting flange. For instance, the machine is configured to prepare a beverage by circulating a liquid into such capsule and centrifugally driving such capsule, e.g. as discussed above.

For instance, the machine incorporates one or more of the features disclosed in WO 2014/096122 or WO 2014/096123.

The machine includes a holder with a cavity having an upwardly oriented mouth for receiving the capsule via the mouth. The capsule may include a capsule flange extending generally in parallel to the mouth when the capsule is in the cavity. The mouth may be contained in a horizontal plane. The holder can be drivable in rotation by a motorized drive axis.

The machine has a cover cooperating with the holder. The cover and the holder are relatively movable, e.g. manually or automatically, along a movement path from: an open position for inserting the capsule inbetween the holder and cover into the cavity and/or for removing the capsule from inbetween the holder and cover; to a closed position for extracting the capsule in the cavity.

The cover can have: one or more capsule opening elements, such as piercing blades and/or pins; and/or a liquid inlet, e.g. a central inlet, for feeding a liquid into the capsule and/or a liquid outlet, e.g. one or more peripheral outlets, for evacuating liquid from the capsule.

The cover can be associated with a pusher for separating the capsule from the cover in the open position (e.g. at removal of the capsule). The pusher may be movable between a retracted position in the closed position and a deployed position in the open position. The pusher may be resiliently assembled to the cover.

The capsule holder can be incorporated into an ingredient processing module of a beverage preparation device, typically of the centrifugal type, e.g. as disclosed in EP 2 000 062, EP 2 155 020, EP 2 152 128, WO 2008/148646, WO 2009/106175, WO 2009/106589, WO 2010/026045, WO 2010/026053, WO 2010/066736, WO 2008/148650, WO 2008/148834, WO 2010/066705, WO 2010/063644 and WO 2011/023711. The capsule may be of the type described above under the header "field of the invention". The capsule may be a capsule that has a container-body, e.g. a generally cup-shaped or hemispherical or hemi-ellipsoidal body, having a flange to which a cover lid is attached, in particular sealed. Typically the capsule contains a beverage ingredient.

The machine is usually configured to circulate a liquid into the capsule, typically for mixing with the ingredient, e.g. brewing the ingredient, contained in the capsule. A flavoured beverage may be prepared by circulating a carrier liquid, such as water, into the capsule for mixing the carrier with the ingredient and form the beverage, e.g. by brewing. An automatic capsule recognition system may be used to parameterize and adjust the processing of the ingredient automatically in line with the type of ingredient and/or amount of ingredient.

Typically, the machine includes one or more of the following components:
a) a fluid system in fluid connection with the capsule holder;
b) an in-line heater and/or cooler for thermally conditioning a flow of liquid circulated into the capsule holder or a batch heater and/or cooler for circulating thermally conditioned liquid from the batch heater and/or cooler to the capsule holder;
c) a pump for pumping liquid to the capsule holder, in particular a low pressure pump e.g. within the range of 1 to 5 bar, such as 1.5 to 3 bar;
d) a motor for driving the capsule holder in rotation during beverage preparation;
e) an electric control unit, in particular comprising a printed circuit board (PCB), for receiving instructions from a user via an input user-interface and for controlling the heater and/or cooler, pump and motor(s); and/or
f) one or more sensors for sensing at least one characteristic selected from characteristics of fluid system, the heater and/or cooler, the pump, a liquid tank, an ingredient collector, a flow of the liquid (e.g. by a flowmeter), a pressure of the liquid and a temperature of the liquid, and for communicating such characteristic(s) to the control unit.

Moreover, the capsule holder is typically associated with a beverage collection and dispensing system, e.g. as disclosed in WO 2009/106175 and WO 2010/089329.

The machine comprises a capsule transfer device having a capsule guide for guiding the capsule from the holder to a used-capsule evacuation area, for instance to a used-capsule collector.

The capsule guide extends along an evacuation direction and is configured to seize the capsule (when the capsule is in the cavity) and hold the capsule above the holder and to guide the capsule towards the evacuation area along the evacuation direction. The movement path (of the cover/holder) and the evacuation direction are at an angle favouring a movement of the capsule under the effect of gravity along the capsule guide towards the evacuation area.

The capsule guide may include a wire or stripe or rail, e.g. a grooved rail or a head rail, to form a capsule slide.

In accordance with the invention, the capsule guide is tiltable during the relative movement of the holder and the cover from the closed position to the open position to reduce this angle (favouring the movement of the capsule) so as to increase the effect of gravity for moving the capsule towards the evacuation area.

The holder and the cover can be covered by a lid that is movable from an open position to a closed position by the relatively moving holder and cover or vice versa. The lid can be a pivotally mounted lid.

For instance, the lid is provided with a handle for actuating the lid between the open and closed positions, the handle optionally controlling the opening and/or the closing of the holder and the cover.

The holder and the cover can be relatively movable from the closed position to the open position along a straight axis such as a vertical axis.

The holder and the cover can be translationally relatively movable from the open position into the closed position and vice versa, for instance along an axial direction of the cavity and/or along a straight line.

The holder and the cover may delimit in the open position an access for positioning freehanded the capsule into the cavity, e.g. for a manual insertion of the capsule into the cavity.

It is also possible to provide a mechanism to transfer the capsule into the cavity, for example a mechanism integrated in the capsule transfer device, such as an introductory part of the capsule guide e.g. slides. For example, the guide (or slides) integrates (an) intermediate stop element(s) for positioning the capsule between the holder and the cover at insertion, the capsule being passed beyond, e.g. forced beyond, the stop element(s) by the cover and/or holder acting accordingly onto the capsule when they are relatively moved to their closed position so that the capsule is free to move along the guide after the stop element(s) when the cover and holder are moved into their open position.

The capsule guide may be urged, e.g. by a spring element, against at least one of the holder and cover during the relative movement of the holder and the cover e.g. against a guiding surface thereof that is angled away from the movement path, whereby the capsule guide is tilted so as to change the guide's angle (favouring the movement of the capsule) as the guide is so urged while the holder and the cover are relatively moved.

The capsule guide can be pivotally fixed about at least one pivot point to at least one of the holder and cover so that during the relative movement of the holder and the cover the capsule guide is tilted about the at least one pivot point to change the angle (favouring the movement of the capsule).

For instance, the capsule guide is pivotally fixed about at least one pivot point of the cover and is urged against the holder during the relative movement of the holder and the cover whereby the capsule guide is tilted so as to change the guide's angle (favouring the movement of the capsule) as the guide is so urged while the holder and the cover are relatively moved.

The angle (favouring the movement of the capsule) may vary:
a) in a range contained between 0 to 90 deg, such as in a range between:
   0 and 15 deg when the holder and the cover are in the closed position; and
   15 to 60 deg when the holder and the cover are in the open position;
and/or
b) only while the holder and the cover are relatively moved over a fraction of the movement path, such as a fraction of the movement path starting at the closed position of the holder and the cover and/or over a fraction in the range of $1/20$ to $1/3$ of the movement path, e.g. $1/10$ to $1/4$ thereof.

The capsule guide may include at least one capsule slide that is fixed to at least one connecting section, e.g. a connecting section extending along a connecting direction angled away from the evacuation direction, which is pivotally mounted on a corresponding pivot point. The slide can be tiltable and fixed to a first connecting section and to a second connecting section which are both mounted about a pivoting axis. The first connecting section may space the tiltable slide from the pivoting axis more than the second connection section.

At least one capsule slide includes a first capsule slide that is fixed to a first connecting section and a second capsule slide that is fixed to a first connecting section, the first connection sections being pivotally mounted on corresponding pivot points.

The first capsule slide can be fixed to a first connecting section and to a second connecting section which are both mounted about a pivoting axis and the second capsule slide can be fixed to a first connecting section and to a second connecting section which are both mounted about a pivoting axis. For instance, first connection sections space the tiltable slides from the pivoting axis more than the second connection sections.

The first connection sections may cross (or partly overlap) each other between their respective capsule slide and pivot points.

The capsule guide may include a pair of facing slides configured to seize the capsule under a capsule flange thereof that projects peripherally about the capsule body. For instance, the facing slides are configured to lift the capsule above the holder and/or to maintain the capsule above the holder while the holder is withdrawn under the capsule.

The capsule guide can include a wire or stripe or rail, such as a grooved rail or a head rail, to form a capsule slide.

The evacuation direction can be at an angle in the range of 0 to 80 deg. to a horizontal direction when such machine is positioned in an orientation for preparing a beverage. Typically, the machine has a foot for resting on an external generally horizontal support surface in the machine's orientation for preparing a beverage.

This angle to the horizontal direction can be in the range of: 0 to 15 deg when the holder and the cover are in the closed position; and 15 to 60 deg when the holder and the cover are in the open position.

The angle to the horizontal may increase during the relative movement of the holder and the cover from the closed position to the open position so as to increase the effect of gravity for moving the capsule along the guide towards the evacuation area. For instance, the angle to the horizontal increases only while the holder and the cover are relatively moved over a fraction of the movement path, such as a fraction of the movement path starting at the closed position of the holder and the cover and/or a fraction in the range of $1/20$ to $1/3$ of the movement path, e.g. $1/10$ to $1/4$ thereof.

The machine may incorporate a capsule displacer, such as a biased displacer, for moving the capsule outwards of the holder when the holder and the cover are moved out of the closed position and for facilitating seizure of said capsule by the capsule guide. The displacer may act on a capsule flange of the capsule to move the capsule outwards of the holder. For instance, the displacer is constrained when the holder and the cover are moved into the closed position and is released when the holder and the cover are moved out of the closed position.

The holder and the cover in the closed position may form a processing chamber for the capsule, the processing chamber leading to an dispensing outlet for dispensing beverage processed in the chamber.

The holder and the cover can be configured to rotate about an axis to process the capsule by centrifugation.

The holder and the cover can be provided with a liquid inlet, such as a water inlet, for supplying liquid to the chamber, such as into the capsule, to process an ingredient, e.g. tea or coffee or cacao or powder milk, in the capsule, and with a chamber outlet for an outflow of beverage from the chamber to the dispensing outlet. For instance, the liquid inlet and the chamber outlet are: both in the cover; or both in the holder; or are provided one in the holder and one in the cover.

The chamber can have a liquid inlet, e.g. a forming a hollow capsule piercing element adjacent to a capsule pusher, connected to a thermal conditioner, such as a heater and/or a cooler, by which liquid is thermally conditioned prior to being supplied via the liquid inlet to the chamber, such as a thermal conditioner in thermal conduction with a beverage passage fluidically connecting the dispensing outlet to a chamber outlet, e.g. associated with one or more capsule piercing elements.

The invention also relates to a combination of a machine as described above and a capsule for being handled by the slides and the capsule mover.

A further aspect of the invention relates to a method of handling a capsule by the above machine or handling a capsule in the above combination, comprising:
  extracting the capsule between the holder and the cover in the closed position;
  relatively moving the holder and the cover out of the closed position towards the open position;
  seizing the capsule with the capsule guide to hold the capsule above the holder; and
  tilting the capsule guide to reduce the angle between the guide's evacuation direction and the movement path of the relative movement of the holder and the cover during their relative movement to the open position so as to increase the effect of gravity for moving the capsule along the capsule guide towards the evacuation area.

Another aspect of the invention relates to a use of a capsule for: the above machine; or implementing the above combination.

The capsule may have a body that is symmetric or asymmetric, conical or frusto-conical or cylindrical or spherical or hemispherical or frusto-spherical, containing the ingredient, e.g. ground coffee, tea or cacao or another beverage ingredient.

BRIEF DESCRIPTION OF THE DRAWINGS

The invention will now be described with reference to the schematic drawings, wherein.

DETAILED DESCRIPTION

Figure 1:
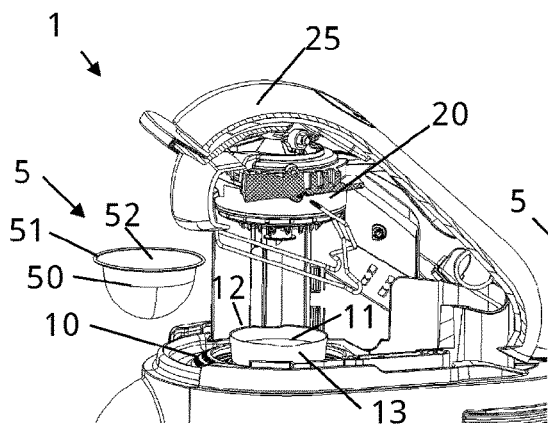
FIG. 1 is a perspective side view of part of a partly cut-away machine according to the invention in a capsule loading configuration, the holder and the cover being in the open position.
Figure 2:
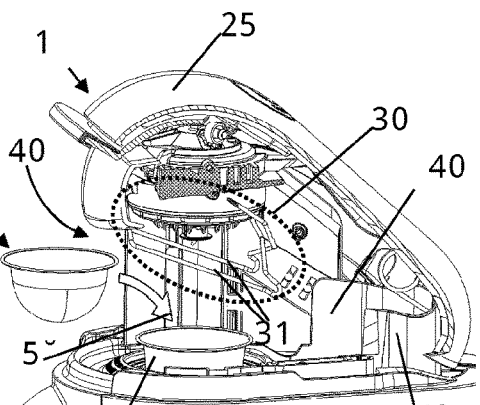
FIG. 2 illustrates the loading movement of a capsule in the machine of FIG. 1.
Figure 3:
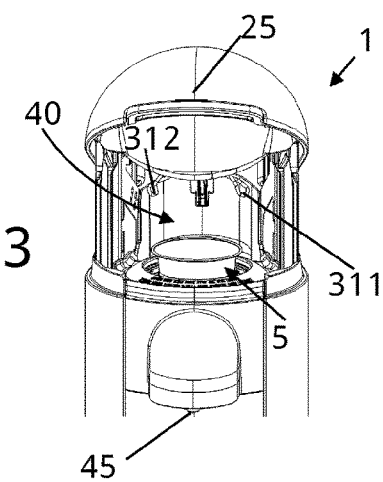
FIG. 3 is a perspective front view of the machine of FIG. 2.
Figure 4:
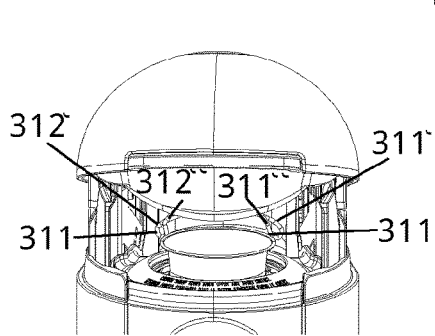
FIG. 4 is a perspective front view of the machine of FIG. 3 when the holder and cover are about half-way between their open position and closed position, FIG. 4a illustrating a perspective side view thereof.
Figure 4A:
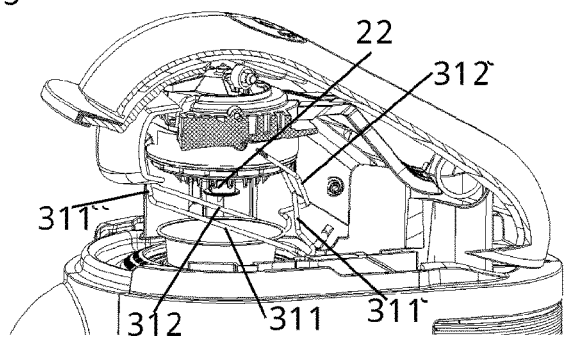
Figure 5:
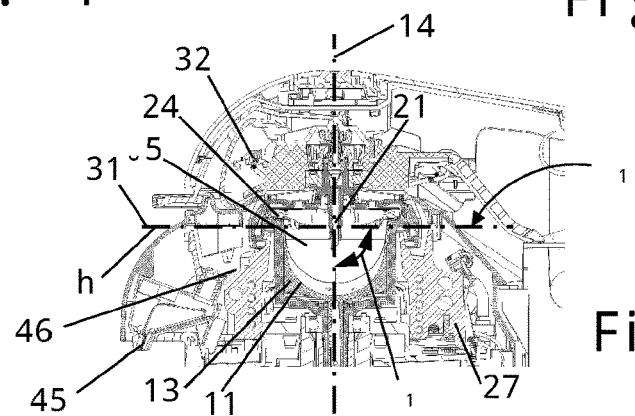
FIG. 5 is a cross-section side view of the machine of FIG. 4 when the holder and the cover are in their closed position to enclosed the capsule.
Figure 6:
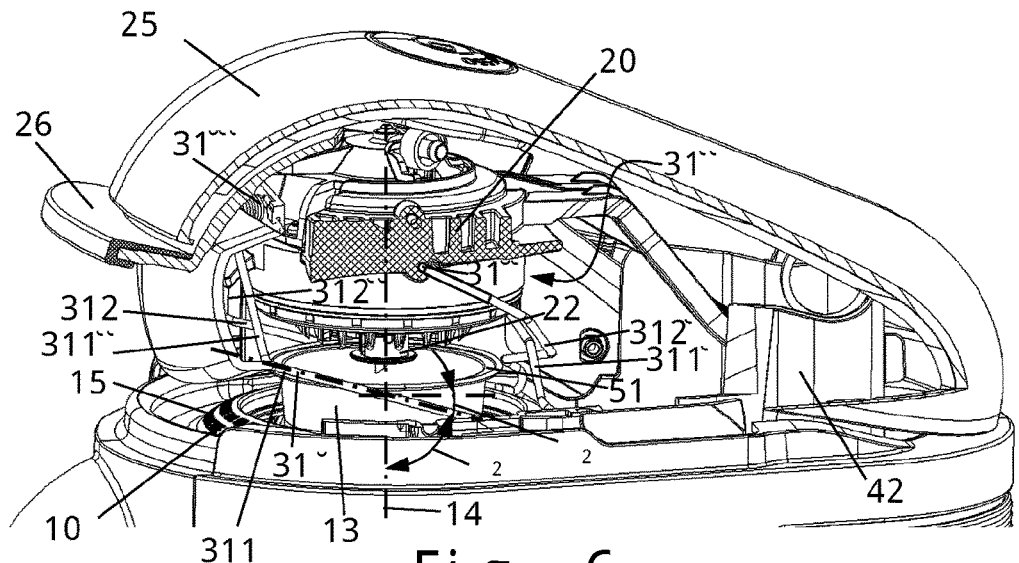
FIG. 6 is a perspective side view of part of the machine of FIG. 5 in which the holder and the cover are relatively moved out of their closed position, the capsule being seized by the capsule guide of the transfer device.
Figure 7:
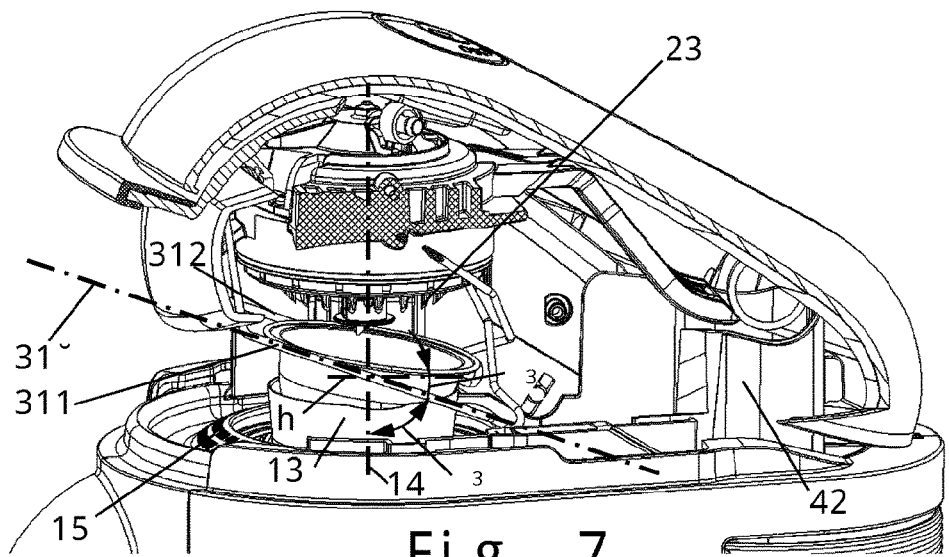
FIG. 7 is a perspective side view of part of the machine of FIG. 6 in which the holder and the cover are about half-way between their closed and open positions, the capsule being held by the capsule guide.
Figures 8, 9:
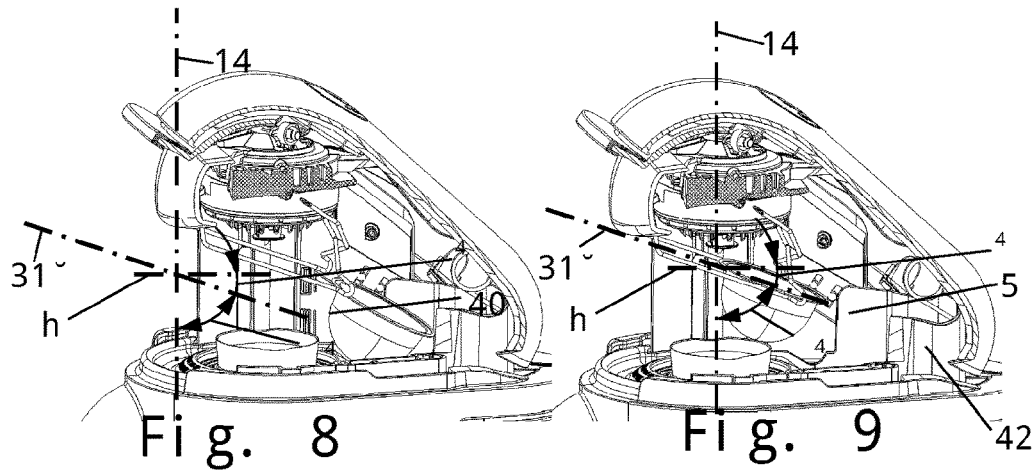
FIG. 8 is a perspective side view of part of the machine of FIG. 7 in which the holder and the cover are in their open position, the capsule sliding along the guide to the evacuation area.
FIG. 9 is a perspective side view of part of the machine of FIG. 8 in which the holder and the cover are in their open position, the capsule falling off from the guide to the evacuation area.

FIGS. 1 to 9 illustrate an exemplary embodiment of a capsule processing machine 1 handling an ingredient capsule 5 having a body 50 containing an ingredient, in accordance with the invention.

Beverage may be prepared by using machine 1 for instance by circulating a liquid, e.g. water such as thermally conditioned water, into capsule 5 and centrifugally driving capsule 5.

Machine 1 includes a holder 10 with a cavity 11 having an upwardly oriented mouth 12, such as a mouth 12 generally contained in a horizontal plane, for receiving capsule 5 via mouth 12. Capsule 5 may include a flange 51 extending generally in parallel to the mouth 12 when capsule 5 is in cavity 11. Holder 10 may be driven in rotation by a motorized drive axis 14.

Machine 1 has a cover 20 cooperating with holder 10 such that cover 20 and holder 10 are relatively movable, e.g. manually and/or automatically, along a movement path from: an open position for inserting capsule 5 inbetween holder 10 and cover 20 into cavity 11 and/or for removing capsule 5 from inbetween holder 10 and cover 20; to a closed position for extracting capsule 5 in cavity 11.

Cover 20 can be associated with a pusher 22 for separating capsule 5 from cover 20 in the open position (e.g. at removal of capsule 5). Pusher 22 can be movable between a retracted position in the closed position and a deployed position in the open position. For instance, pusher 22 is resiliently assembled to cover 20.

Machine 1 includes a capsule transfer device 30 having a capsule guide 31 for guiding capsule 5 from holder 10 to a used-capsule evacuation area 40, e.g. to a used-capsule collector 42.

Capsule guide 31 extends along an evacuation direction 31' and is configured to seize capsule 5 (when capsule 5 is in cavity 11) and hold capsule 5 above holder 10 and to guide capsule 5 towards evacuation area 40 along evacuation direction 31'. Movement path 14 and evacuation direction 31' are at an angle $\alpha_1, \alpha_2, \alpha_3, \alpha_4$ favouring a movement of capsule 5 under the effect of gravity along capsule guide 31 towards evacuation area 40. Capsule guide 31 may include or may be made of a wire or stripe or rail, e.g. a grooved rail or a head rail, to form a capsule slide 311,312.

Capsule guide 31 is tiltable during the relative movement of holder 10 and cover 20 from the closed position to the open position to reduce angle $\alpha_1, \alpha_2, \alpha_3, \alpha_4$ so as to increase the effect of gravity for moving capsule towards evacuation area 40.

Holder 10 and cover 20 can be covered by a lid 25 that is movable from an open position to a closed position by the relatively moving holder 10 and cover 20. Lid 25 can be a pivotally mounted lid 25. For instance, lid 25 is provided with a handle 26 for actuating the lid 25 between the open and closed positions that optionally controls the opening and/or the closing of the holder and the cover.

Holder 10 and cover 20 can be relatively movable from the closed position to the open position along a straight axis 14 such as a vertical axis 14. Holder 10 and cover 20 may be translationally relatively movable from the open position into the closed position and vice versa, for instance along an axial direction 14 of cavity 11 and/or along a straight line 14.

Holder 10 and cover 20 may delimit in the open position an access 40 for positioning freehanded 5' capsule 50 into cavity 11.

Capsule guide 31 can be urged, e.g. by a spring element 32, against at least one of holder 10 and cover 20 during the relative movement of holder 10 and cover 20 e.g. against a guiding surface 15 thereof that is angled away from the movement path 14, whereby capsule guide 31 is tilted so as to change angle $\alpha_1, \alpha_2, \alpha_3, \alpha_4$ as guide 31 is so urged while holder 10 and cover 20 are relatively moved.

Capsule guide 31 can be pivotally fixed about at least one pivot point 31",31'" to at least one of holder 10 and cover 20 so that during the relative movement of holder 10 and cover 20 capsule guide 31 is tilted about the at least one pivot point 31",31'" to change angle $\alpha_1, \alpha_2, \alpha_3, \alpha_4$. Capsule guide 31 can be pivotally fixed about at least one pivot point 31",31'" of cover 20 and can be urged against holder 10 during the relative movement of holder 10 and cover 20 whereby capsule guide 31 is tilted so as to change angle $\alpha_1, \alpha_2, \alpha_3, \alpha_4$ as it is so urged while holder 10 and cover 20 are relatively moved.

Angle $\alpha_1, \alpha_2, \alpha_3, \alpha_4$ may vary in a range contained between 0 to 90 deg, such as in a range between: 0 and 15 deg when holder 10 and cover 20 are in the closed position; and 15 to 60 deg when holder 10 and the cover 20 are in the open position.

Angle $\alpha_1, \alpha_2, \alpha_3, \alpha_4$ may vary only while holder 10 and cover 20 are relatively moved over a fraction of movement path 14, such as a fraction of movement path 14 starting at the closed position of holder 10 and cover 20 and/or over a fraction in the range of 1/20 to 1/3 of movement path 14, e.g. 1/10 to 1/4 thereof.

Capsule guide 31 may include at least one capsule slide 311,312 that is fixed to at least one connecting section 311',311",312',312", e.g. a connecting section extending along a connecting direction angled away from evacuation direction 31', which is pivotally mounted on a corresponding pivot point 31",31'". Slide 311,312 may be tiltable and fixed to a first connecting section 311',312' and fixed to a second connecting section 311",312" which are both mounted about a pivoting axis 31"-31'". First connecting section 311',312' may space tiltable slide 311,312 from pivoting axis 31"-31'" more than second connection section 311",312" from the pivoting axis.

At least one capsule slide 311,312 may include a first capsule slide 311 that is fixed to a first connecting section 311' and a second capsule slide 312 that is fixed to a first connecting section 312'. First connection sections 311',312' can be pivotally mounted on corresponding pivot points 31".

First capsule slide 311 can be fixed to a first connecting section 311' and to a second connecting section 311" which are both mounted about a pivoting axis 31"-31'". Second capsule slide 312 can be fixed to a first connecting section 312' and to a second connecting section 312" which are both mounted about a pivoting axis 31"-31'". First connection sections 311',312' may space tiltable slides 311,312 from the pivoting axis 31"-31'" more than second connection sections 311",312" from the pivoting axis.

First connection sections 311',312' crossing (or partly overlapping) each other between their respective capsule slide 311,312 and pivot points 31".

Capsule guide 31 can include a pair of facing slides 311,312 configured to seize capsule 5 under a capsule flange 51 thereof that projects peripherally about capsule body 50. For instance, facing slides 311,312 are configured to lift capsule 5 above holder 10 and/or to maintain the capsule above the holder while the holder is withdrawn under the capsule.

Evacuation direction 31' can be at an angle $\delta_1,\delta_2,\delta_3,\delta_4$ in the range of 0 to 80 deg. to a horizontal direction h when such machine 1 is positioned in an orientation for preparing a beverage, such as at an angle $\delta_1,\delta_2,\delta_3,\delta_4$ in the range of:
  0 to 15 deg when holder 10 and cover 20 are in the closed position; and
  15 to 60 deg when the holder 10 and cover 20 are in the open position.

Angle $\delta_1,\delta_2,\delta_3,\delta_4$ may increase during the relative movement of holder 10 and cover 20 from the closed position to the open position so as to increase the effect of gravity for moving capsule 5 along guide 31 towards evacuation area 40. Angle $\delta_1,\delta_2,\delta_3,\delta_4$ may be allowed to increase only while holder 10 and cover 20 are relatively moved over a fraction of the movement path 14, such as a fraction of the movement path 14 starting at the closed position of holder 10 and cover 20 and/or a fraction in the range of 1/20 to 1/3 of movement path 14, e.g. 1/10 to 1/4 thereof.

Machine 1 may include a capsule displacer 13, such as a biased displacer, for moving capsule 5 outwards of holder 10 when holder 10 and cover 20 are moved out of the closed position and for facilitating seizure of capsule 5 by capsule guide 31. Displacer 13 may act on a capsule flange 51 of capsule 5 to move capsule 5 outwards of holder 10. For instance, displacer 13 is constrained when holder 10 and cover 20 are moved into the closed position and is released when holder 10 and cover 20 are moved out of the closed position.

Holder 10 and cover 20 in the closed position can form a processing chamber for capsule 5, the processing chamber leading to an dispensing outlet 45 for dispensing beverage processed in the chamber.

Holder 10 and cover 20 can be configured to rotate about an axis 14 to process capsule 5 by centrifugation.

Holder 10 and cover 20 may be provided with a liquid inlet 25, such as a water inlet, for supplying liquid to the chamber, such as into capsule 5, to process an ingredient, e.g. tea or coffee or cacao or powder milk, in capsule 5, and with a chamber outlet 24 for an outflow of beverage from chamber to the dispensing outlet 45. Liquid inlet 25 and chamber outlet 24 can be: both in cover 20; or both in holder 10; or provided one in holder 10 and one in cover 20.

Chamber may have a liquid inlet 25, e.g. a forming a hollow capsule piercing element (21) adjacent to a capsule pusher (22), connected to a thermal conditioner 27, such as a heater and/or a cooler, by which liquid is thermally conditioned prior to being supplied via liquid inlet 25 to the chamber. Thermal conditioner 27 may be in thermal conduction with a beverage passage 46 fluidically connecting dispensing outlet 45 to a chamber outlet 24, e.g. associated with one or more capsule piercing elements (23).

During operation, capsule 5 may be extracted between holder 10 and cover 20 in the closed position. Holder 10 and cover 20 may be relatively moved out of the closed position towards the open position. Capsule 5 may be seized with capsule guide 31 to hold capsule 5 above holder 10. Capsule guide 31 can be tilted to reduce angle $\alpha_1,\alpha_2,\alpha_3,\alpha_4$ between the guide's evacuation direction 31' and movement path 14 of the relative movement of holder and cover 20 during their relative movement to the open position so as to increase the effect of gravity for moving capsule 5 along capsule guide 31 towards evacuation area 40.

Capsule 5 can have a body 50 that can be, symmetric or asymmetric, conical or frusto-conical or cylindrical or spherical or hemispherical or frusto-spherical or domical or frusto-domical, containing the ingredient, e.g. ground coffee, tea or cacao or another beverage ingredient.

The invention claimed is:

1. A capsule processing machine for preparing a beverage from a capsule having a body containing an ingredient, the capsule processing machine comprising:
  a holder with a cavity having an upwardly oriented mouth, for receiving the capsule via the mouth,
  a cover cooperating with the holder such that the cover and the holder are relatively movable along a movement path from:
    an open position for inserting the capsule inbetween the holder and the cover into the cavity and/or for removing the capsule from inbetween the holder and the cover; to
    a closed position for extracting the beverage from the capsule in the cavity, a capsule transfer device having a capsule guide for guiding the capsule from the holder to a used-capsule evacuation area,
  the capsule guide extending along an evacuation direction and being configured to seize the capsule and hold the capsule above the holder and to guide the capsule towards the used-capsule evacuation area along the evacuation direction, the movement path and the evacuation direction defining an angle favoring a movement of the capsule under the effect of gravity along the capsule guide towards the used-capsule evacuation area; and
  the capsule guide is tiltable during the relative movement of the holder and the cover from the closed position to the open position to reduce the angle between the movement path of the cover and the holder and the evacuation direction of the capsule guide so as to increase the effect of gravity for moving the capsule towards the used-capsule evacuation area.

2. The capsule processing machine of claim 1, wherein the holder and the cover are relatively movable from the closed position to the open position along a straight axis.

3. The capsule processing machine of claim 1, wherein the holder and the cover define in the open position an access for positioning freehanded the capsule into the cavity.

4. The capsule processing machine of claim 1, wherein the capsule guide is urged against at least one of the holder or the cover during the relative movement of the holder and the cover.

5. The capsule processing machine of claim 1, wherein the angle varies in a range of between 0 to 90 deg. when the holder and the cover are in the closed position; and 15 to 60 deg. when the holder and the cover are in the open position.

6. The capsule processing machine of claim 1, wherein the capsule guide comprises at least one capsule slide that is fixed to at least one connecting section.

7. The capsule processing machine of claim 1, wherein the capsule guide comprises a pair of facing slides configured to seize the capsule under a capsule flange thereof that projects peripherally about the body.

8. The capsule processing machine of claim 1, wherein the evacuation direction is at an angle of 0 to 80 deg. to a horizontal direction when the machine is positioned in an orientation for preparing a beverage.

9. The capsule processing machine of claim 1, comprising a capsule displacer for moving the capsule outwards of the holder when the holder and the cover are moved out of the closed position and for facilitating seizure of the capsule by the capsule guide.

10. The capsule processing machine of claim 1, wherein the holder and the cover in the closed position form a processing chamber for the capsule, the processing chamber leading to a dispensing outlet for dispensing beverage processed in the chamber.

11. A capsule processing machine for preparing a beverage from a capsule having a body containing an ingredient, the capsule processing machine comprising:
a holder with a cavity having an upwardly oriented mouth, for receiving the capsule via the mouth,
a cover cooperating with the holder such that the cover and the holder are relatively movable along a movement path from:
an open position for inserting the capsule inbetween the holder and the cover into the cavity and/or for removing the capsule from inbetween the holder and the cover; to
a closed position for extracting the beverage from the capsule in the cavity,
a capsule transfer device having a capsule guide for guiding the capsule from the holder to a used-capsule evacuation area,
the capsule guide extending along an evacuation direction and being configured to seize the capsule and hold the capsule above the holder and to guide the capsule towards the used-capsule evacuation area along the evacuation direction, the movement path and the evacuation direction being at an angle favoring a movement of the capsule under the effect of gravity along the capsule guide towards the used-capsule evacuation area; and
the capsule guide is tiltable during the relative movement of the holder and the cover from the closed position to the open position to reduce the angle so as to increase the effect of gravity for moving the capsule towards the used-capsule evacuation area,
wherein the capsule guide is pivotally fixed about at least one pivot point to at least one of the holder or the cover, so that during the relative movement of the holder and the cover, the capsule guide is tilted about the at least one pivot point to change the angle.

12. A capsule processing machine for preparing a beverage from a capsule having a body containing an ingredient, the capsule processing machine comprising:
a holder with a cavity having an upwardly oriented mouth, for receiving the capsule via the mouth,
a cover cooperating with the holder such that the cover and the holder are relatively movable along a movement path from:
an open position for inserting the capsule inbetween the holder and the cover into the cavity and/or for removing the capsule from inbetween the holder and the cover; to
a closed position for extracting the beverage from the capsule in the cavity,
a capsule transfer device having a capsule guide for guiding the capsule from the holder to a used-capsule evacuation area,
the capsule guide extending along an evacuation direction and being configured to seize the capsule and hold the capsule above the holder and to guide the capsule towards the used-capsule evacuation area along the evacuation direction, the movement path and the evacuation direction being at an angle favoring a movement of the capsule under the effect of gravity along the capsule guide towards the used-capsule evacuation area; and
the capsule guide is tiltable during the relative movement of the holder and the cover from the closed position to the open position to reduce the angle so as to increase the effect of gravity for moving the capsule towards the used-capsule evacuation area,
wherein the capsule guide comprises at least one capsule slide that is fixed to at least one connecting section,
wherein the at least one capsule slide comprises a first capsule slide that is fixed to a first connecting section and a second capsule slide that is fixed to a first connecting section, the first connection sections being pivotally mounted on corresponding pivot points.

13. A combination of:
a machine for preparing a beverage from a capsule having a body containing an ingredient, the machine comprising a holder with a cavity having an upwardly oriented mouth, for receiving the capsule via the mouth, a cover cooperating with the holder such that the cover and the holder are relatively movable along a movement path from an open position for inserting the capsule inbetween the holder and the cover into the cavity and/or for removing the capsule from inbetween the holder and the cover to a closed position for extracting the beverage from the capsule in the cavity, a capsule transfer device having a capsule guide for guiding the capsule from the holder to a used-capsule evacuation area, the capsule guide extending along an evacuation direction and being configured to seize the capsule and hold the capsule above the holder and to guide the capsule towards the used-capsule evacuation area along the evacuation direction, the movement path and the evacuation direction defining an angle favoring a movement of the capsule under the effect of gravity along the capsule guide towards the used-capsule evacuation area; and the capsule guide is tiltable during the relative movement of the holder and the cover from the closed position to the open position to reduce the angle between the movement path of the cover and the holder and the evacuation direction of the capsule guide so as to increase the effect of gravity for moving the capsule towards the used-capsule evacuation area; and the capsule for being handled by the capsule guide and a capsule mover.

14. The combination of claim 13, wherein the capsule guide is pivotally fixed about at least one pivot point to at least one of the holder and the cover, so that during the relative movement of the holder and the cover, the capsule guide is tilted about the at least one pivot point to change the angle.

15. The combination of claim 13, wherein the capsule guide comprises at least one capsule slide that is fixed to at least one connecting section, and wherein the at least one capsule slide comprises a first capsule slide that is fixed to a first connecting section and a second capsule slide that is fixed to a first connecting section, the first connection sections being pivotally mounted on corresponding pivot points.

16. A method of handling a capsule by a machine, the method comprising:

extracting a beverage from the capsule between a holder and a cover of the machine in a closed position;

relatively moving the holder and the cover along a movement path out of the closed position towards an open position;

seizing the capsule with a capsule guide to hold the capsule above the holder; and tilting the capsule guide to reduce an angle defined by an evacuation direction of the capsule guide and the movement path of the relative movement of the holder and the cover during their relative movement to the open position to increase the effect of gravity for moving the capsule along the capsule guide towards an evacuation area.

17. The method of claim 16, wherein the capsule guide is pivotally fixed about at least one pivot point to at least one of the holder and the cover, so that during the relative movement of the holder and the cover, the capsule guide is tilted about the at least one pivot point to change the angle.

18. The method of claim 16, wherein the capsule guide comprises at least one capsule slide that is fixed to at least one connecting section, and wherein the at least one capsule slide comprises a first capsule slide that is fixed to a first connecting section and a second capsule slide that is fixed to a first connecting section, the first connection sections being pivotally mounted on corresponding pivot points.

* * * * *